United States Patent
Wu et al.

(10) Patent No.: US 10,583,839 B2
(45) Date of Patent: Mar. 10, 2020

(54) METHOD OF LANE CHANGE DECISION-MAKING AND PATH PLANNING

(71) Applicant: AUTOMOTIVE RESEARCH & TESTING CENTER, Changhua Hsien (TW)

(72) Inventors: Tzu-Sung Wu, Changhua Hsien (TW); Wei-Jen Wang, Changhua Hsien (TW); Jin-Yan Hsu, Changhua Hsien (TW)

(73) Assignee: AUTOMOTIVE RESEARCH & TESTING CENTER, Changhua Hsien (TW)

( * ) Notice: Subject to any disclaimer, the term of this patent is extended or adjusted under 35 U.S.C. 154(b) by 313 days.

(21) Appl. No.: 15/856,744

(22) Filed: Dec. 28, 2017

(65) Prior Publication Data

US 2019/0202462 A1    Jul. 4, 2019

(51) Int. Cl.
*B60W 30/18* (2012.01)
*B60W 40/04* (2006.01)
*B60W 40/105* (2012.01)

(52) U.S. Cl.
CPC ...... *B60W 30/18163* (2013.01); *B60W 40/04* (2013.01); *B60W 40/105* (2013.01); *B60W 2420/42* (2013.01); *B60W 2420/52* (2013.01); *B60W 2520/10* (2013.01); *B60W 2550/14* (2013.01); *B60W 2550/302* (2013.01); *B60W 2550/304* (2013.01); *B60W 2550/306* (2013.01); *B60W 2550/406* (2013.01); *B60W 2750/30* (2013.01)

(58) Field of Classification Search
CPC ......... B60W 2420/42; B60W 2420/52; B60W 2520/10; B60W 2550/14; B60W 2550/302; B60W 2550/304; B60W 2550/306; B60W 2550/406; B60W 2750/30; B60W 30/18163; B60W 40/04; B60W 40/105
See application file for complete search history.

(56) References Cited

U.S. PATENT DOCUMENTS 9,910,443 B1 * 3/2018 Lee .................. G08G 1/166
2008/0192984 A1 * 8/2008 Higuchi ............. G08G 1/16
                                                        382/104

(Continued)

*Primary Examiner* — Babar Sarwar
(74) *Attorney, Agent, or Firm* — Birch, Stewart, Kolasch & Birch, LLP

(57) ABSTRACT

A method of lane change and path planning that receives sensed signals from multiple sensors through a car computer on a vehicle to generate multiple traveling speed time-sorted information and multiple surrounding circumstance time-sorted information, and to further generate a 3×3 grid corresponding to the surroundings of the vehicle; when receiving a signal to switch on the turn signals, the car computer selects data within a time interval from those traveling speed time-sorted information and surrounding circumstance time-sorted information, respectively; and then the selected data is to be processed together with the 3×3 grid to generate a lane change space, and through a decision strategy to determine whether the lane change space complies with a safety movement strategy, and then the car computer generates a planned path of movement, such that a safest space for assisting lane change is provided for improving convenience and safety.

10 Claims, 6 Drawing Sheets

(56) References Cited

U.S. PATENT DOCUMENTS

| | | | | |
|---|---|---|---|---|
| 2009/0005961 | A1* | 1/2009 | Grabowski | G01C 21/365 701/532 |
| 2010/0121518 | A1* | 5/2010 | Tiernan | G01C 21/165 701/26 |
| 2012/0035798 | A1* | 2/2012 | Barfoot | G08G 1/20 701/25 |
| 2014/0207325 | A1* | 7/2014 | Mudalige | B62D 15/025 701/26 |
| 2015/0253772 | A1* | 9/2015 | Solyom | G05D 1/0212 701/25 |
| 2015/0253778 | A1* | 9/2015 | Rothoff | G05D 1/0088 701/25 |
| 2016/0063858 | A1* | 3/2016 | Schmudderich | B60W 50/14 701/117 |
| 2016/0116916 | A1* | 4/2016 | Pink | G05D 1/0274 701/23 |
| 2016/0335892 | A1* | 11/2016 | Okada | B60T 7/22 |
| 2017/0006429 | A1* | 1/2017 | Douglas | H04W 4/023 |
| 2017/0199523 | A1* | 7/2017 | Barton-Sweeney | G01C 21/3415 |
| 2017/0236413 | A1* | 8/2017 | Takagi | B60R 21/00 701/117 |
| 2018/0061230 | A1* | 3/2018 | Madigan | B60W 50/14 |
| 2018/0088582 | A1* | 3/2018 | Kong | G05D 1/0214 |
| 2018/0101172 | A1* | 4/2018 | Min | G01C 21/32 |
| 2018/0189323 | A1* | 7/2018 | Wheeler | G05D 1/0274 |
| 2018/0217601 | A1* | 8/2018 | Marcoux | G05D 1/0061 |
| 2018/0218601 | A1* | 8/2018 | Aoki | B60W 50/0097 |
| 2018/0244173 | A1* | 8/2018 | Toyoda | B60W 30/00 |
| 2018/0286247 | A1* | 10/2018 | Fujita | G08G 1/167 |
| 2019/0023239 | A1* | 1/2019 | Fujita | B60W 40/04 |
| 2019/0033876 | A1* | 1/2019 | Aoki | G08G 1/16 |
| 2019/0084571 | A1* | 3/2019 | Zhu | G05D 1/0088 |
| 2019/0113351 | A1* | 4/2019 | Antony | B60W 50/10 |
| 2019/0196465 | A1* | 6/2019 | Hummelshoj | G05D 1/0016 |
| 2019/0278280 | A1* | 9/2019 | Imai | B60W 50/14 |

* cited by examiner

METHOD OF LANE CHANGE DECISION-MAKING AND PATH PLANNING

BACKGROUND OF THE INVENTION

1. Field of the Invention

The present invention is about a method for a vehicle to make decisions and to plan its paths, especially about a method of lane change decision-making and path planning which is applied to vehicles.

2. Description of the Prior Arts

In order to improve the convenience and safety for driving, many auto makers have developed their own Autopilot systems to assist drivers to drive vehicles. Mainly through deploying a plurality of different sensors on the vehicle, such as Radar, image capturing devices (like cameras) or GPS, as well as through software such as the image recognition software in car computers, and the captured images are processed to obtain information such as a relative position with respect to the front vehicle, relative distance, lane width, lane marking location, etc. The information can be further processed based on the data sensed by the Radar such as the relative speed with respect to the front vehicle, so that the vehicle can enter automatic cruise control (ACC) to achieve automatic car following, lane departure warning, and to assist drivers by integrating with automatic emergency brake (AEB) system, and through blind spot sensing and anti-collision system.

Nowadays auto makers are developing lane change assistant for high speed driving (over 60 kilometers per hour), so that the vehicle will assist the driver by automatically providing lane change assistance according to the direction of the turn signals switched by the driver. However, the prior arts of the lane change assistants are not applicable under low speed conditions

SUMMARY OF THE INVENTION

In view of the problems existing in the prior art, the present invention provides a method for lane change decision-making and path planning. The method mainly generates a 3×3 grid according to the current traveling speed of the vehicle and the surrounding circumstances of the vehicle by confirming, within the vehicle's surrounding area, other vehicles' driving conditions as well as determines whether the relative distances from other vehicles comply with a safety movement strategy, and then a planned path of movement will be generated for the vehicle to change lane following the planned path of movement so as to provide the change lane assistance with the safest lane change space under any arbitrary speed, and therewith to achieve the objectives of improving lane change convenience and safety.

In order to achieve the above objectives, the technical solution adopted is to apply the aforementioned lane change decision-making and path planning method to a vehicle whose car computer receives signal data sensed by a plurality of sensors on the vehicle, and the car computer executes the following steps:

receiving multiple traveling speed sensed data and multiple surrounding circumstance sensed data, and respectively generating traveling speed time-sorted information and surrounding circumstance time-sorted information;

according to the traveling speed time-sorted information and the surrounding circumstance time-sorted information, generating a 3×3 grid which corresponds to a surrounding area of the vehicle;

according to a switch-on signal of turn signals, selecting multiple data within a time interval respectively from the traveling speed time-sorted information and the surrounding circumstance time-sorted information, and generating at least one lane change space based on the selected data and the 3×3 grid;

through a decision-making model, determining whether the lane change space complies with a safety movement strategy, and then generating a planned path of movement for the vehicle.

According to the aforementioned method, the car computer generates a corresponding 3×3 grid based on the traveling speed and the surrounding circumstances of the vehicle. When the switch-on signal of turn signals is received, the car computer selects multiple data respectively from the traveling speed time-sorted information and the surrounding circumstance time-sorted information and generates the lane change space based on the selected data and the 3×3 grid, wherein the lane change space is the safest braking distance for the front vehicle and the vehicle behind in the current lane of the vehicle as well as for the front vehicle and the vehicle behind in the target lane of the lane change, and through a decision-making model, the car computer determines whether the lane change space complies with a safety movement strategy, and then the car computer generates a planned path of movement and controls the vehicle to change lane. The 3×3 grid of the present invention is adjusted based on the traveling speed of the vehicle and surrounding circumstances, and with that, the corresponding 3×3 grid can be provided no matter whether the traveling speed is over or under 60 Km/hr, and based on the target lane to change to as well as other surrounding vehicles within the coverage area of the 3×3 grid to determine whether the target lane to change to has enough safe space, so as to provide the change lane assistance by the safest lane change space, and therewith to achieve the objectives of improving lane change convenience and safety.

Other objectives, advantages and novel features of the invention will become more apparent from the following detailed description when taken in conjunction with the accompanying drawings.

DETAILED DESCRIPTION OF THE PREFERRED EMBODIMENTS

The following, with the drawings and the preferred embodiment of the present invention, further illustrates the technical means that the present invention adopts to achieve the intended purpose.

Figure 1:
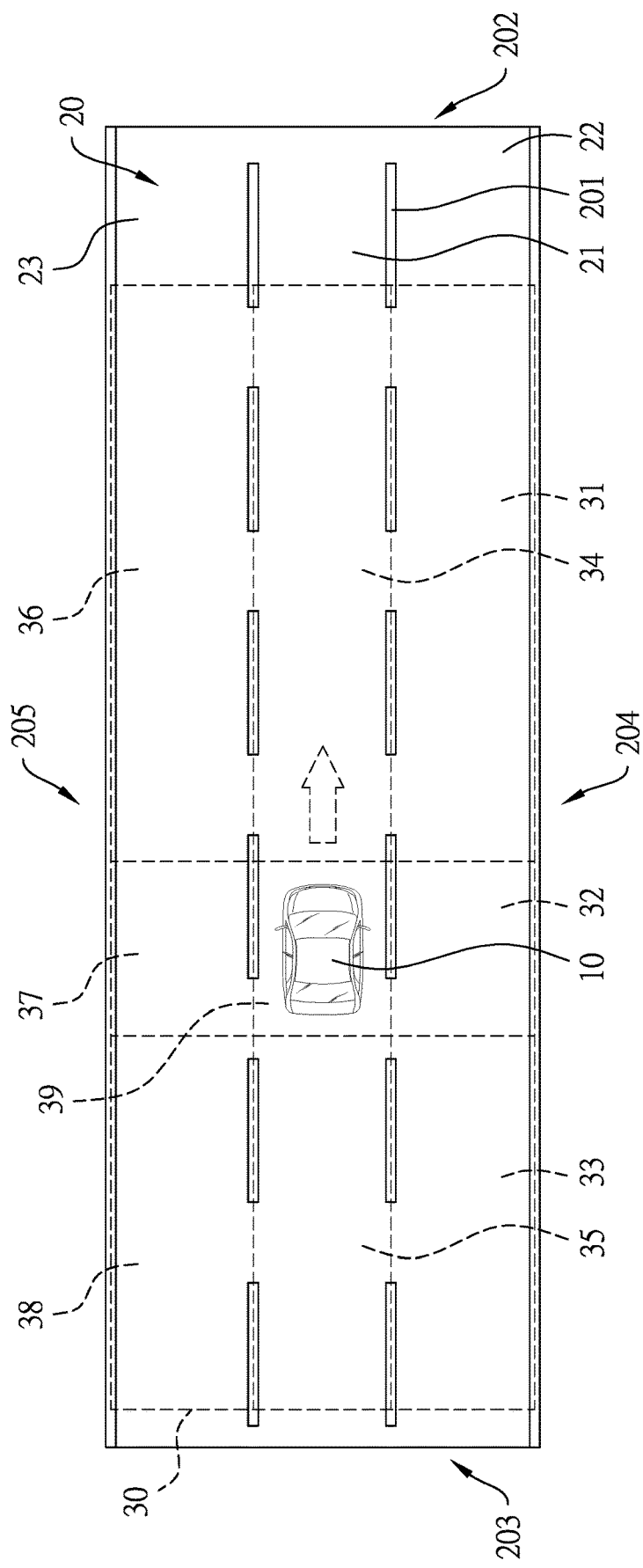
FIG. 1 shows a first 3×3 grid schematic of a preferred embodiment of the present invention.
Figure 2:
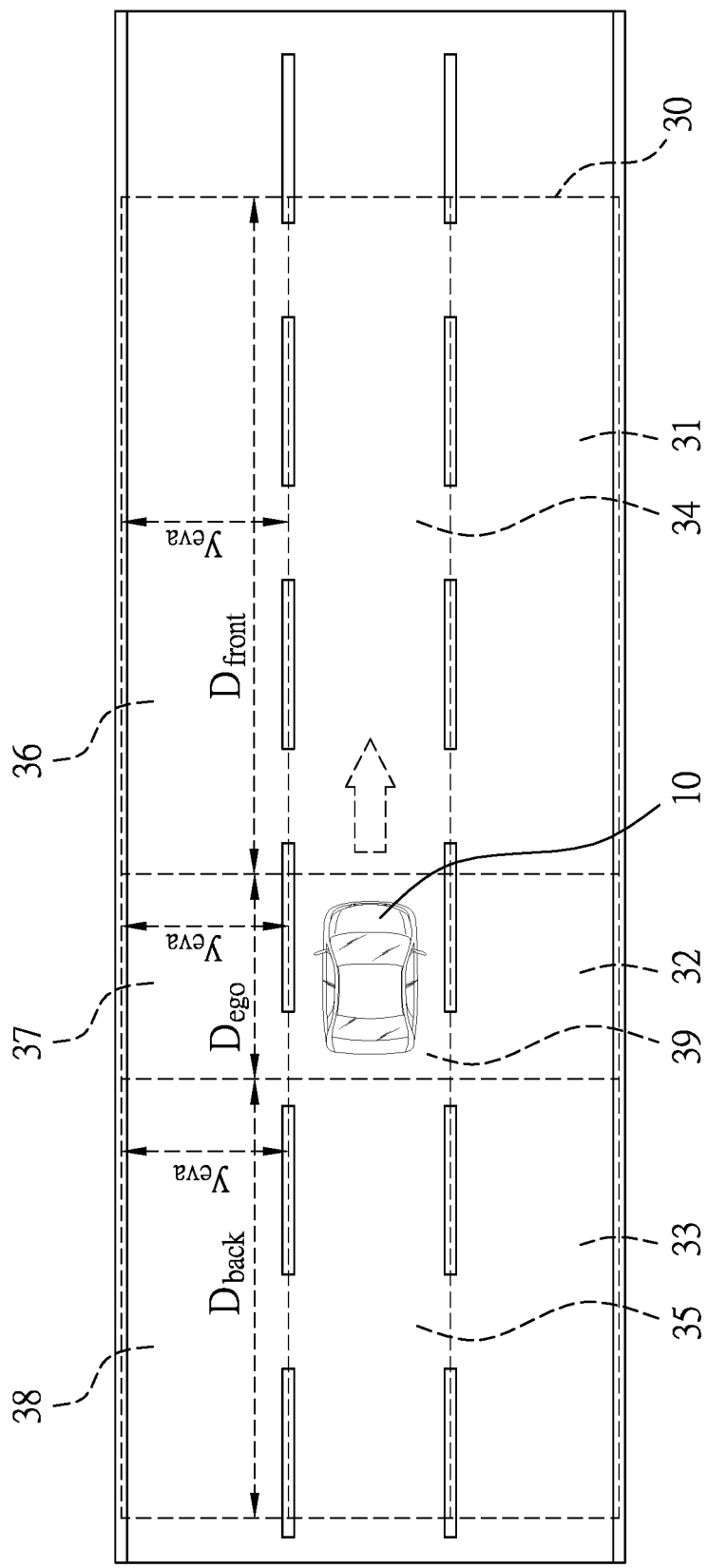
FIG. 2 shows a second 3×3 grid schematic of a preferred embodiment of the present invention.

Referring to FIG. 1 and FIG. 2, the method for lane change decision-making and path planning of the present invention is applied to a host vehicle 10 and is executed by a car computer on the host vehicle 10 to assist the host vehicle 10 in change lane decision-making and path planning. The host vehicle 10 is equipped with a plurality of different sensors such as radar, image capturing devices (such as cameras) or GPS (Global Positioning System) sensors. When the host vehicle 10 runs on a road 20, the surrounding circumstances of the host vehicle 10 and the traveling speed are sensed by sensors on the host vehicle 10 and the captured image is processed through the image recognition software in the car computer to obtain the surrounding vehicles' positions, distances, speeds, lane width, lane marking position and other information.

The road 20 is partitioned by a plurality of lane markings 201 into a central lane 21, an outer lane 22 and an inner lane 23, wherein the road as illustrated by the drawings is only an example and it is not limited thereto. Taking the direction of FIG. 1 as an example, the lane under the central lane 21 (the right hand side lane when the vehicle travels along the direction of the road) is the outer lane 22, and the lane above the central lane 21 (the left hand side lane when the vehicle travels along the direction of the road) is the inner lane 23, and the direction along which the host vehicle 10 travels on the road is the longitudinal direction which includes a first direction 202 pointing to the front side of the vehicle and a second direction 203 pointing to the rear side; and the direction along which the host vehicle 10 changes lane is the lateral direction including a third direction 204 along which the vehicle deviates towards the outer lane 22 and a fourth direction 205 along which the vehicle deviates towards the inner lane 23.

In the following, the traveling of the host vehicle 10 on the central lane 21 is taken as an example, multiple traveling speed sensed data and multiple surrounding circumstance sensed data is sensed through sensors on the host vehicle 10, wherein the multiple traveling speed sensed data include information about the relative longitudinal speed, the relative lateral acceleration and the relative acceleration between the host vehicle 10 and other surrounding vehicles, the longitudinal speed and the lateral speed of the host vehicle 10 as well as the longitudinal speeds and the lateral speeds of the surrounding vehicles; and the surrounding circumstance sensed data include information such as the lane width of the middle lane 21, the lane width of the outer lane 22, the lane width of the inner lane 23, and the sensing of the presence of vehicles and their locations within the surrounding area of the host vehicle 10.

Since the sensors of the host vehicle 10 sense and then transmit sensed data to the car computer at every sensing time point, the car computer respectively sorts the multiple traveling speed sensed data and the multiple surrounding circumstance sensed data in time sequence according to the sensing time of each data, and then the data is respectively processed to get a traveling speed time-sorted information and a surrounding circumstance time-sorted information, then the information can be retrieved directly and conveniently by the car computer to get the data within a certain time interval when the car computer determines to change lane. Further examples to briefly describe how to process to obtain the time-sorted information are shown in the table below:

| information | sensing time | | |
|---|---|---|---|
| | T1 | T2 | T3 |
| the longitudinal acceleration of the first lane change | $V_{longitudinal\_11}$ | $V_{longitudinal\_12}$ | $V_{longitudinal\_13}$ |
| the longitudinal acceleration of the second lane change | $V_{longitudinal\_21}$ | $V_{longitudinal\_22}$ | |

Because within each lane change time, the retrieved time sequenced data is of a different length for the car computer, and in order to allow the car computer to process the data sensed at time point T1, T2, T3, namely, $V_{longitudinal\_11}$, $V_{longitudinal\_12}$, $V_{longitudinal\_13}$ as one processing data, the longitudinal speed data of the first lane change is sequenced by time as the time-sorted information such as $[V_{longitudinal\_11}, V_{longitudinal\_12}, V_{longitudinal\_13}]$, and the longitudinal speed data of the second lane change is sequenced by time as the time-sorted information such as $[V_{longitudinal\_21}, V_{longitudinal\_22}]$.

However, since each lane change time could be different from another, the amounts of data retrieved could also differ. For example, the longitudinal speed data of the first lane change is retrieved within T1 to T3 time intervals, but the longitudinal speed data of the second lane change is retrieved within T1 to T2 time interval, so the information lengths of the time-sorted information of the longitudinal speed data of the first and the second lane changes are not the same, resulting in ineffective handling by the car computer. In order for the car computer to process time-sorted information effectively, by way of time-sorted information unification, namely, to firstly compare the information lengths of the time-sorted information of the longitudinal speed data of the first and the second lane changes with a default information length, for example, the default information length is three pieces of data but not limited thereto, so the information length of the time-sorted information of the longitudinal speed data of the first lane change is the same as the default information length. However, the information length of the time-sorted information of the longitudinal speed data of the second lane change is only two pieces. Hence, the information length of the time-sorted information of the longitudinal speed data of the second lane change is less than the default information length. Then, the time-sorted information of the longitudinal speed of the second lane change will be padded with "None" data at the T3 sensing time point, where "None" represents a null value data, so as to set the longitudinal speed of the second lane change at T3 sensing time point with blank data to indicate that no data is sensed. Therefore, the time-sorted information of the longitudinal speed data of the second lane change is $[V_{longitudinal\_21}, V_{longitudinal\_22}, None]$. In other words, the sensing time point without sensed data in the time-sorted information of the longitudinal speed data of the second lane change is padded with blank data so that the length of the time-sorted information for lane change will always be the same as the default information length so as to facilitate the car computer to process the current as well as follow-up time-sorted information for lane change.

The car computer processes the multiple traveling speed sensed data and the multiple surrounding circumstance sensed data into the multiple traveling speed time-sorted information and the multiple surrounding circumstance time-sorted information through time sequencing and information unification. According to the traveling speed time-sorted information and the surrounding circumstance time-sorted information, the car computer generates a 3×3 grid 30 which corresponds to the vehicle's surroundings and to relate to the central lane 21, the outer lane 22 and the inner lane 23. The 3×3 grid 30 comprises a first block 31, a second block 32, a third block 33, a fourth block 34, a fifth block 35, a sixth block 36, a seventh block 37, an eighth block 38, and a ninth block 39 which is surrounded by the first to the eighth blocks 31~38. The ninth block 39 corresponds to the location of the host vehicle 10. The first block 31, the fourth block 34 and the sixth block 36 (they are also called front blocks hereinafter) are located in the first direction 202 of the host vehicle 10, with the first block 31 corresponding to the outer lane 22, the fourth block 34 corresponding to the central lane 21 and the sixth block 36 corresponding to the inner lane 23. The second block 32 is located in the third direction 204 of the host vehicle 10 and corresponds to the outer lane 22, and the seventh block 37 is located at the fourth direction 205 of the host vehicle 10 and corresponds to the inner lane 23 (The second block 32 and the seventh block 37 are also called side blocks hereinafter). The third block 33, the fifth block 35 and the eighth block 38 (they are also called back blocks hereinafter) are located in the second direction 203 of the host vehicle 10, with the third blocks 33 corresponding to the outer lane 22, the fifth block 35 corresponding to the central lane 21 and the eighth block 38 corresponding to the inner lane 23.

It should be particularly noted that the 3×3 grid 30 is generated based on continuously sensed multiple traveling speed sensed data and multiple surrounding circumstance sensed data.

The coverage area of each block of the 3×3 grid 30 changes as the speed of the host vehicle 10 changes.

In this embodiment, the coverage areas of the first block 31, the fourth block 34 and the sixth block 36 in the 3×3 grid 30 each have a longitudinal length as well as a lateral length, and the lateral length is the width of the lane, and the longitudinal lengths of the first block 31, the fourth block 34 and the sixth block 36 are each calculated according to the following formula:

$$D_{front} = \max\{D_{break}, D_{min_{ego}}\} + \max\{V_{ego} - V_{front}, 0\} \times \text{Time}_{LC};$$

$D_{front}$: the longitudinal length of a front block's coverage area;
$D_{break}$: the braking distance between the host vehicle and a front vehicle;
$D_{min_{ego}}$: the minimum safe distance between the host vehicle and the front vehicle;
$V_{ego}$: longitudinal speed of the host vehicle;
$V_{front}$: longitudinal speed of the front vehicle;
$\text{Time}_{LC}$: lane change time for the host vehicle;
wherein, $D_{break}$ is calculated by the following formula:

$$D_{break} = V_{ego} \times (TB + TTR) + L_{ego};$$

TB: collision time with the front vehicle (Time to Breaking, TB);
TTR: response time (Time To React); based on the driver's reaction time developed by the European New Car Assessment Program (Euro NACP);
wherein, TB is calculated by the following formula:

$$TB = -\frac{S}{V_r} + \frac{\sqrt{V_r^2 - 2Sa_r}}{a_r};$$

S: the relative longitudinal distance between the host vehicle and the front vehicle;
$V_r$: the relative longitudinal speed between the host vehicle and the front vehicle;
$a_r$: the relative acceleration between the host vehicle and the front vehicle;

$$a_r = -0.4g, g = 9.8;$$

wherein, $D_{min_{ego}}$ is calculated by the following formula:

$$D_{min_{ego}} = V_{ego}/2;$$

wherein, $\text{Time}_{LC}$ is calculated by the following formula:

$$\text{Time}_{LC} = 2t_1 + 2t_2;$$

$t_1$: the first acceleration time of the lane change;
$t_2$: the second acceleration time of the lane change;
wherein, $t_1$ is calculated by the following formula:

$$t_1 = a/J;$$

a: lateral acceleration; in this embodiment, a is a preset value which may be set according to the actual situation, wherein a preferred value of a may be 1.5 but not limited thereto;
J: jitter; wherein, J is a preset value which may be set according to the actual situation, wherein a preferred value of J may be 3, but not limited thereto;
wherein, $t_2$ is calculated by the following formula:

$$t_2 = \frac{-t_1^2 + \sqrt{t_1^4 + 4t_1 \frac{y_{eva}}{J}}}{2t_1};$$

$y_{eva}$: lane width.

In this embodiment, the coverage areas of the second block 32 and the seventh block 37 in the 3×3 grid 30 each have the longitudinal length and the lateral length, and the lateral length is the width of the lane. The longitudinal lengths of the coverage areas of the second block 32 and the seventh block 37 are each calculated according to the following formula:

$$D_{ego} = \max\{D_{break}, D_{min_{ego}}\} + \max\{V_{ego} - V_{front}, 0\} \times TTR;$$

$D_{ego}$: the longitudinal length of the side block's coverage area.

In this embodiment, the coverage areas of the third block 33, the fifth block 35 and the eighth block 38 in the 3×3 grid 30 each have a longitudinal length and a lateral length, and the lateral length is the width of the lane, and the longitudinal lengths of the third block 33, the fifth block 35 and the eighth block 38 are each calculated according to the following formula:

$$D_{back} = D_{min} + \max\{V_{break} - V_{ego}, 0\} \times \text{Time}_{LC};$$

$D_{back}$: the longitudinal length of a back block's coverage area;
$D_{min}$: the minimum safe distance between the host vehicle and a vehicle behind;

$$D_{min} = V_{back}/2;$$

$V_{back}$: longitudinal speed of the vehicle behind.

Figure 3:
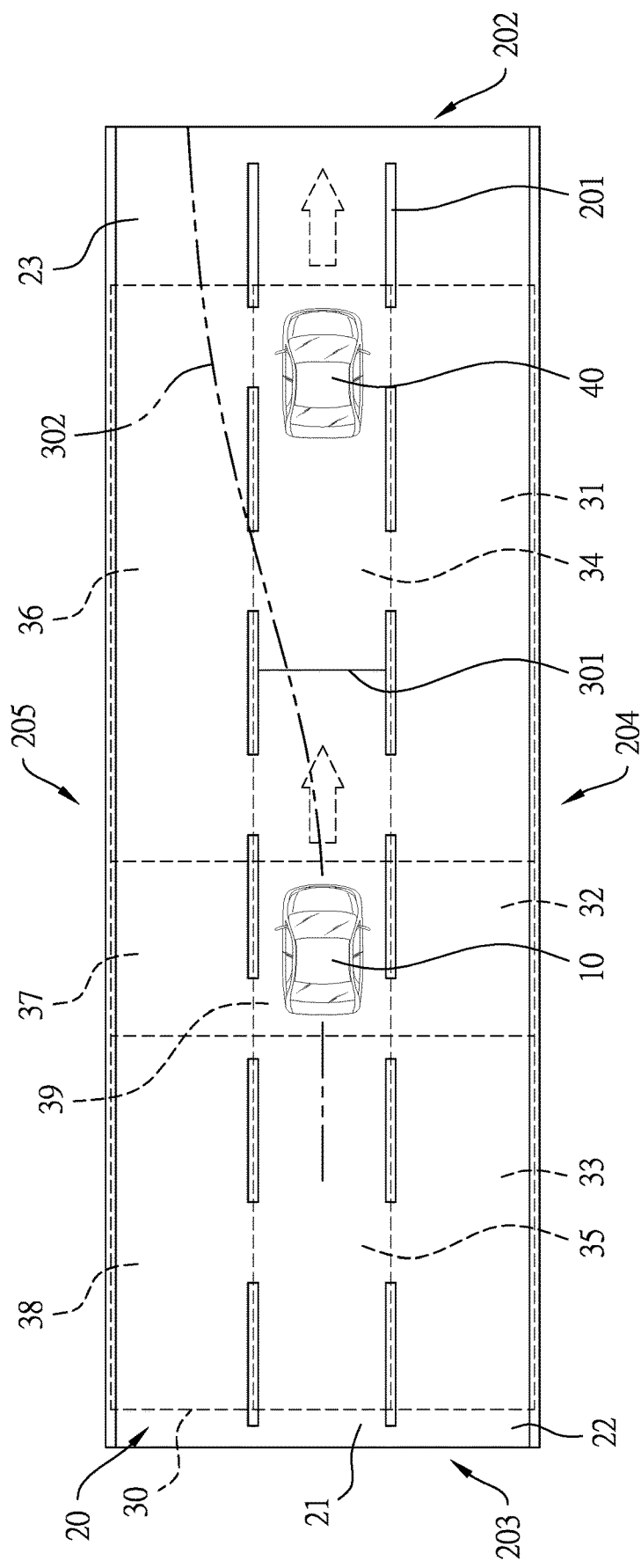
FIG. 3 shows a first application schematic of a preferred embodiment of the present invention.

After the car computer of the host vehicle 10 generates the 3×3 grid 30, as shown in FIG. 3, and when the car computer of the host vehicle 10 receives a switch-on signal of the turn signals such as the switch-on signal of the left turn signal light, the car computer selects multiple data within a time interval respectively from the traveling speed time-sorted information and the surrounding circumstance time-sorted information, and generates at least one lane change space based on the selected data and the 3×3 grid; and the lane change space is provided for the car computer to determine. Namely, the car computer generates a safe distance indicator 301 while determining whether the lane change space complies with a safety movement strategy based on a decision-making model, and if affirmative, then the car computer generates a planned path of movement 302 based on a trapezoidal acceleration trajectory, and then the car computer controls the host vehicle 10 to change lane from the current central lane 21 to the target inner lane 23 following the planned path of movement 302.

Specifically, for example, when it is sensed that a front vehicle 40 is in the fourth block 34 and the driver intends to change lane from the central lane 21 to the inner lane 23, then, when the car computer receives the switch-on signal of the turn signals, the car computer will calculate the lane change space according to the selected data and the 3×3 grid 30 and determines whether the lane change space complies with the safety movement strategy through the decision-making model. The lane change space refers to the safest braking distance for the host vehicle 10 and the front vehicle 40 within the fourth block 34, and when the lane change space between the host vehicle 10 and the front vehicle 40 complies with the safety movement strategy, then the car computer will mark a safe distance indicator 301 for the fourth block 34 to be used by the car computer and generates the planned path of movement 302.

In this embodiment, the manner of retrieving the data within the time interval from the traveling speed time-sorted information and the surrounding circumstance time-sorted information refers to the situation that at the time point when the car computer receives the switch-on signal of the turn signals, the car computer will start to search and to retrieve from the traveling speed time-sorted information and the surrounding circumstance time-sorted information for the data corresponding to the time point and the time interval further backward. The time interval may be set as, for example, 0.4 second, but not limited thereto.

In this embodiment, since the switch-on signal of the turn signals is a continuously output pulse signal, each time the car computer receives the switch-on signal, it will reselect multiple data within the time interval respectively from the traveling speed time-sorted information and the surrounding circumstance time-sorted information, and generates at least one lane change space based on the selected data and the 3×3 grid, until the switch-on signal of the turn signals is no longer received by the car computer.

In this embodiment, the decision-making model is a neural decision-making model, which is based on the traveling speed sensed data and the surrounding circumstance sensed data during the time of testing, and it generates the corresponding 3×3 grid for testing as well as the lane change space, and then, it will determine whether the lane change space complies with a safe space distance, and if affirmative, the lane change space will be stored as a safety movement strategy. In this way, one or more safety movement strategies are trained according to different circumstances. Therefore, the neural nodes of such neural decision-making model are implemented based on the parameter values of the traveling speed sensed data, the surrounding circumstance sensed data, the 3×3 grid, the lane width, and the switch-on signal of the turn signals.

Figure 4:
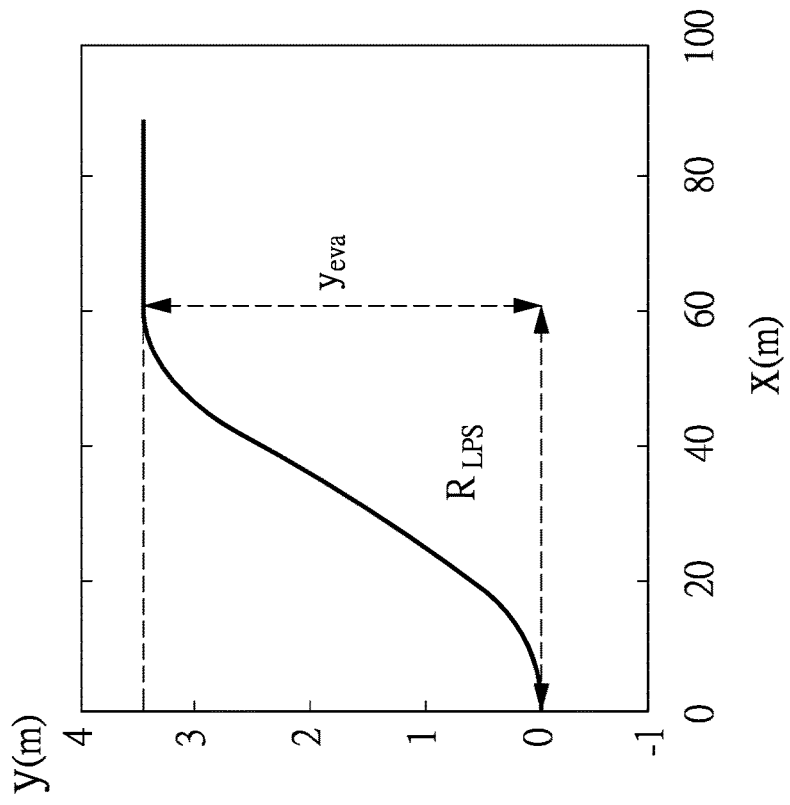
FIG. 4 shows a trapezoidal trajectory schematic of a preferred embodiment of the present invention.
Figure 5:
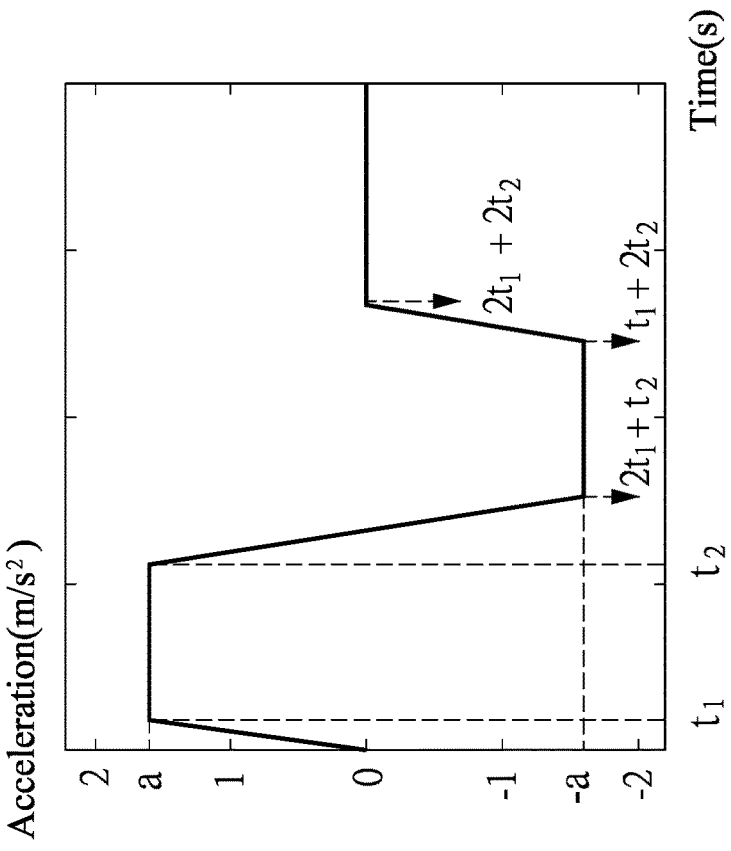
FIG. 5 shows a movement distance schematic of a preferred embodiment of the present invention.

The planning of the planned path of movement 302 is as shown in FIG. 4 and FIG. 5. After the car computer receives the switch-on signal of the turn signals, the car computer generates the planned path of movement through a trapezoidal acceleration trajectory model based on the first and the second acceleration time of the lane change $t_1$, $t_2$, the longitudinal speed of host vehicle 10, and the lane width.

The planned path of movement includes a longitudinal movement distance and a lateral movement distance, and the formula for calculating the longitudinal movement distance required for the lane change of the host vehicle 10 is as follows:

$$R_{LPS} = V_{ego} \times \text{Time}_{LC};$$

$R_{LPS}$: a longitudinal movement distance of lane change; moreover, the lateral movement distance is the width of the lane $y_{eva}$.

In the present embodiment, it is assumed $a=1.5$ m/s$^2$ (meter: m; second: s), $J=3$ m/s$^3$, $y_{eva}=3.5$ m, $t_1=0.5$ s, $t_2=1.31$ s, $R_{LPS}=60.3$ m, but not limited thereto.

Through the trapezoidal acceleration trajectory model as shown in FIG. 4, during a time interval $0 \sim t_1$ the host vehicle 10 starts moving laterally and after the host vehicle 10 moves from the central lane 21 to the middle of the inner lane 23, the host vehicle 10 will keep steady during a time interval $t_1 \sim t_2$, and then it will undergo a steering wheel correction time interval $t_2 \sim 2t_1+t_2$, and then it will keep steady during a time interval $2t_1+t_2 \sim t_1+2t_2$, and then it will undergo another steering wheel correction time interval $t_1+2t_2 \sim 2t_1+2t_2$. From the above, the change of vehicle acceleration while the host vehicle 10 is turning can be known and plus the longitudinal movement distance and the lateral movement distance $y_{eva}$ from FIG. 5, and then the planned path of movement can be generated based on the above-mentioned information.

In this embodiment, the steering wheel is rotated to generate a steering wheel signal when the host vehicle changes lanes according to the planned path of movement. The car computer determines whether the rotation value of the steering wheel signal exceeds a default rotation value, and if affirmative, it is deemed that the host vehicle 10 has started to change lane, and when a switch-off signal of the turn signals is received, the vehicle computer deletes the traveling speed time-sorted information and the surrounding circumstance time-sorted information data within the time interval which is between the time point when the car computer determines that the rotation value of the steering wheel signal exceeds a default rotation value, and the time point when the car computer receives the switch-off signal of the turn signals.

Figure 6:
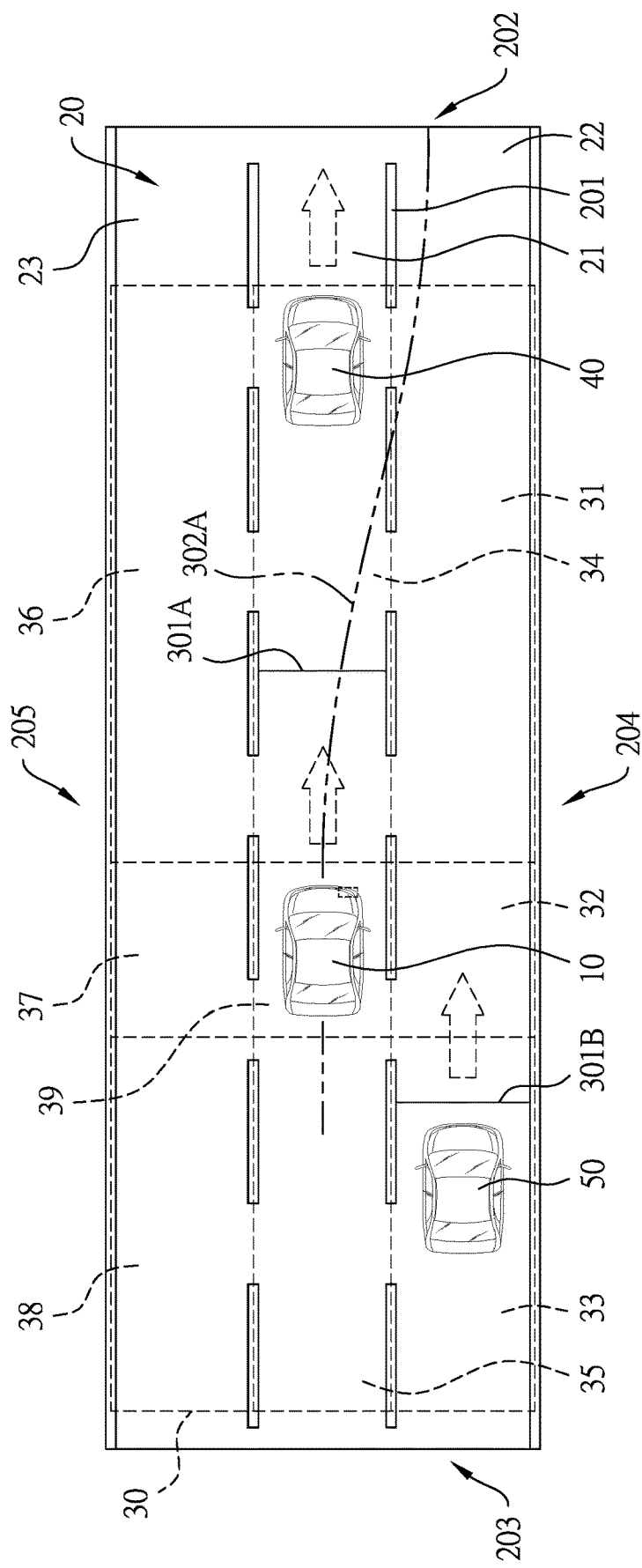
FIG. 6 shows a second application schematic of a preferred embodiment of the present invention.

In this embodiment, reference is made to FIG. 6 for the schematic of another application. The host vehicle 10 senses that a front vehicle 40 is in the fourth block 34 and an approaching vehicle 50 behind is in the third block 33 and the driver intends to change lane. The car computer of the host vehicle 10 will receive a switch-on signal of a right turn signal light, that is, the host vehicle 10 intends to change lane from the central lane 21 to the outer lane 22. The car computer will select multiple data within the time interval from the traveling speed time-sorted information and the surrounding circumstance time-sorted information respectively, and based on the selected data and the 3×3 grid 30, the car computer will generate a corresponding lane change space for the fourth block 34 and a corresponding lane change space for the third block 33. The car computer will determine whether the two above-mentioned lane change spaces comply with a safety movement strategy. If affirmative, then a first safe distance indicator 301A will be labeled on the fourth block 34 and a second safe distance indicator 301B will be labeled on the third block 33, and a planned path of movement 302 will be generated to control the host vehicle 10 to change lane from the central lane 21 to the outer lane 22 following the planned path of movement 302.

As seen from the above, before the host vehicle 10 starts to change lanes, it will be determined, based on the sensed data for surrounding circumstances and the vehicle's status, whether the lane to change to and the currently traveling lane have enough safe space in between to allow the host vehicle 10 to change lanes. By the determined safe space which is sufficient for lane change, the car computer of the host vehicle 10 can provide change lane assistance with the safest lane change space under any arbitrary speed, so as to achieve the objectives of improving lane change convenience and safety.

Figure 7:
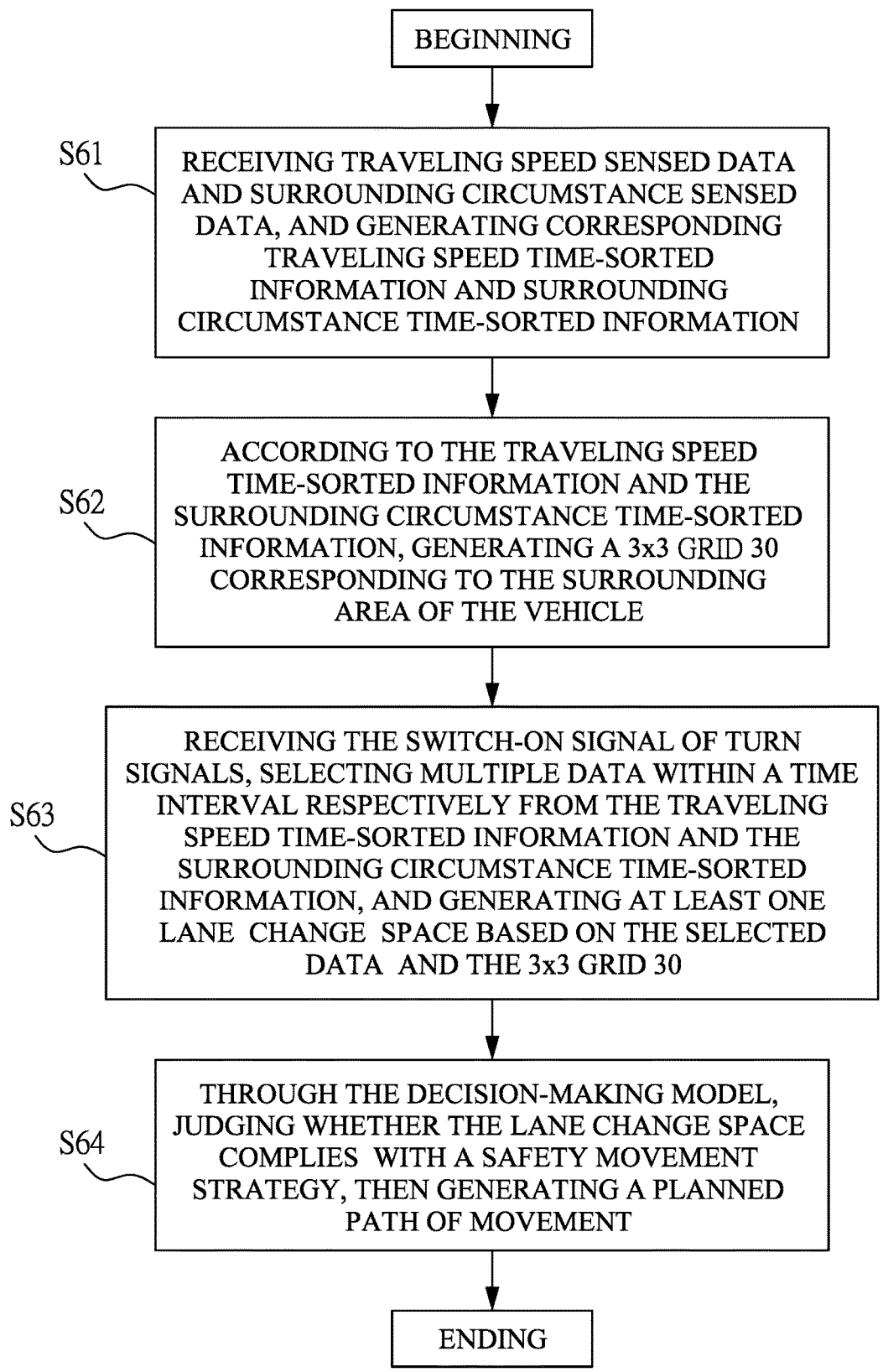
FIG. 7 shows a method flow chart of a preferred embodiment of the present invention.

According to the aforesaid contents, a further summarized flow chart of the method for lane change decision-making and path planning according to the present invention is shown in FIG. 7, with the following steps executed by the car computer of the host vehicle 10:

receiving multiple traveling speed sensed data and multiple surrounding circumstance sensed data, and generating corresponding traveling speed time-sorted information and surrounding circumstance time-sorted information (S61);

according to the traveling speed time-sorted information and the surrounding circumstance time-sorted information, generating a 3×3 grid 30 which corresponds to the surrounding area of the vehicle (S62);

receiving the switch-on signal of turn signals, selecting multiple data within a time interval respectively from the traveling speed time-sorted information and the surrounding circumstance time-sorted information, and generating at least one lane change space based on the selected data and the 3×3 grid 30 (S63);

through the decision-making model, determining whether the lane change space complies with a safety movement strategy, then generating a planned path of movement (S64).

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A method of lane change decision-making and path planning, applied to a host vehicle having multiple sensors to sense data, the data sensed by the sensors being received by a car computer on the host vehicle, and the car computer executing the following steps:

receiving multiple traveling speed sensed data and multiple surrounding circumstance sensed data, and respectively generating traveling speed time-sorted information and surrounding circumstance time-sorted information;

according to the traveling speed time-sorted information and the surrounding circumstance time-sorted information, generating a 3×3 grid which corresponds to a surrounding area of the host vehicle;

according to a switch-on signal of turn signals, selecting multiple data within a time interval from the traveling speed time-sorted information and the surrounding circumstance time-sorted information respectively, and generating at least one lane change space based on the selected data and the 3×3 grid;

through a decision-making model, determining whether the at least one lane change space complies with a safety movement strategy, and then generating a planned path of movement for the host vehicle.

2. The method as claimed in claim 1, wherein the 3×3 grid comprises three front blocks on a front side of the host vehicle, two side blocks on both lateral sides of the host vehicle and three back blocks on a back side of the host vehicle, and each block having a coverage area defined by a longitudinal length and a transverse length of the block;

wherein the longitudinal length of each front block's coverage area is calculated as follows:

$$D_{front} = \max\{D_{break}, D_{min_{ego}}\} + \max\{V_{ego} - V_{front}, 0\} \times Time_{LC};$$

$D_{front}$: a longitudinal length of the front block's coverage area;

$D_{break}$: a braking distance between the host vehicle and a front vehicle;

$D_{min_{ego}}$: a minimum safe distance between the host vehicle and the front vehicle;

$V_{ego}$: longitudinal speed of the host vehicle;

$V_{front}$: longitudinal speed of the front vehicle;

$Time_{LC}$: lane change time for the host vehicle;

wherein, the longitudinal length of each side block's coverage area is calculated as follows:

$$D_{ego} = \max\{D_{break}, D_{min_{ego}}\} + \max\{V_{ego} - V_{front}, 0\} \times TTR;$$

$D_{ego}$: a longitudinal length of the side block's coverage area;

wherein, the longitudinal length of each back block's coverage area is calculated as follows:

$$D_{back} = D_{min} + \max\{V_{break} - V_{ego}, 0\} \times Time_{LC};$$

$D_{back}$: a longitudinal length of the back block's coverage area;

$D_{min}$: the minimum safe distance between the host vehicle and a vehicle behind.

3. The method as claimed in claim 2, wherein the lane change time for the host vehicle is calculated according to the following:

$$Time_{LC} = 2t_1 + 2t_2;$$

$t_1$: a first acceleration time of lane change;

$t_2$: a second acceleration time of lane change.

4. The method as claimed in claim 3, wherein, the first acceleration time of the lane change $t_1$, is calculated according to the following:

$t_1 = a/J;$ a: lateral acceleration;
J: jerk;
wherein the second acceleration time of the lane change $t_2$ is calculated according to the following:

$$t_2 = \frac{-t_1^2 + \sqrt{t_1^4 + 4t_1 \frac{y_{eva}}{J}}}{2t_1};$$

$y_{eva}$: a width of the lane.

5. The method as claimed in claim 4, wherein the braking distance between the host vehicle and the vehicle $D_{break}$ is calculated according to the following:

$D_{break} = V_{ego} \times (TB+TTR) + L_{ego};$

TB: collision time with the front vehicle;
TTR: response time;
wherein the collision time with the front vehicle $D_{break}$ is calculated by the following:

$$TB = -\frac{S}{V_r} + \frac{\sqrt{V_r^2 - 2Sa_r}}{a_r};$$

S: a relative longitudinal distance between the host vehicle and the front vehicle;
$V_r$: relative longitudinal speed between the host vehicle and the front vehicle;
$a_r$: relative acceleration between the host vehicle and the front vehicle;

$a_r = -0.4g, g=9.8;$ wherein the minimum safe distance between the host vehicle and the front vehicle $D_{min_{ego}}$ is calculated by the following:

$D_{min_{ego}} = V_{ego}/2;$ wherein the minimum safe distance between the host vehicle and the vehicle behind $D_{min}$ is calculated by the following:

$D_{min} = V_{back}/2;$ $V_{back}$: longitudinal speed of the vehicle behind.

6. The method as claimed in claim 5, wherein the switch-on signal of the turn signals is a continuously outputting pulse signal, each time the car computer receives the switch-on signal, the car computer reselects multiple data within the time interval from the traveling speed time-sorted information and the surrounding circumstance time-sorted information respectively, and generates the at least one lane change space based on the selected data and the 3×3 grid, until the switch-on signal of the turn signals is no longer received by the car computer.

7. The method as claimed in claim 6, wherein when the car computer receives a steering wheel signal and determines whether a rotation value of the steering wheel signal exceeds a default rotation value, then the car computer deletes the traveling speed time-sorted information and the surrounding circumstance time-sorted information for the time interval between a first time point when the car computer determines that the rotation value of the steering wheel signal exceeds the default rotation value and a second time point when the car computer receives a switch-off signal of the turn signals.

8. The method as claimed in claim 7, wherein, the car computer sorts the traveling speed sensed data and the surrounding circumstance sensed data in time sequence according to the time point when the data is sensed, so as to generate the traveling speed time-sorted information and the surrounding circumstance time-sorted information; and the car computer determines an information length of the traveling speed time-sorted information and the surrounding circumstance time-sorted information for the current lane change, checks whether the information length for the current lane change is shorter than a default information length, and if affirmative, pads in blank data to the traveling speed time-sorted information and the surrounding circumstance time-sorted information for the current lane change so as to keep the information length of the current lane change same as the default information length.

9. The method as claimed in claim 8, wherein, the car computer generates a longitudinal movement distance of lane change according to the lane change time for the host vehicle and the longitudinal speed of the host vehicle, and the car computer also generates the planned path of movement through a trapezoidal acceleration trajectory model based on the first acceleration time of the lane change, the second acceleration time of the lane change, the longitudinal movement distance of lane change and a lane width.

10. The method as claimed in claim 9, wherein, the traveling speed sensed data includes relative longitudinal speed, relative lateral acceleration, and relative acceleration between the host vehicle and its surrounding vehicles, as well as longitudinal speed of the vehicle, and longitudinal speeds and lateral speeds of the surrounding vehicles; the surrounding circumstance sensed data includes the lane width and locations of the surrounding vehicles.

* * * * *